United States Patent
Song (10) Patent No.: US 9,358,858 B2
(45) Date of Patent: Jun. 7, 2016

(54) OPENING AND CLOSING DEVICE OF AIR VENT FOR VEHICLE

(71) Applicant: Hyundai Motor Company, Seoul (KR)

(72) Inventor: Ja Sang Song, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 529 days.

(21) Appl. No.: 13/891,651

(22) Filed: May 10, 2013

(65) Prior Publication Data

US 2014/0235154 A1 Aug. 21, 2014

(30) Foreign Application Priority Data

Feb. 15, 2013 (KR) .................. 10-2013-0016167

(51) Int. Cl.
| | |
|---|---|
| *B60J 7/08* | (2006.01) |
| *B60H 1/26* | (2006.01) |
| *B60J 7/16* | (2006.01) |

(52) U.S. Cl.
CPC .............. *B60H 1/262* (2013.01); *B60J 7/1642* (2013.01)

(58) Field of Classification Search
CPC ........ B60H 1/262; B60J 7/1642; B60J 7/1657
USPC ............ 296/216, 2, 216.03, 216.01, 217, 296/216.02; 49/324, 339, 340, 345; 454/94, 454/83, 84, 87
See application file for complete search history.

(56) References Cited

U.S. PATENT DOCUMENTS

| | | | | |
|---|---|---|---|---|
| 4,115,897 A | * | 9/1978 | Zunkel | E05F 3/102 16/49 |
| 4,412,404 A | * | 11/1983 | Manning | B60J 7/1642 114/201 R |
| 4,964,673 A | * | 10/1990 | Lamparter | B60J 9/02 296/216.02 |
| 5,137,327 A | * | 8/1992 | Edmonds et al. | B60J 9/02 16/259 |
| 6,317,922 B1 | * | 11/2001 | Kondratuk | E05F 3/108 16/49 |
| 6,540,288 B1 | * | 4/2003 | Tobin | B60J 7/1642 296/216.02 |
| 6,609,750 B1 | * | 8/2003 | Cauduro | B60J 7/1642 296/216.02 |
| 7,585,016 B2 | * | 9/2009 | Wehrenberg | B60J 5/0487 160/187 |
| 2011/0006156 A1 | * | 1/2011 | Heeren | F15B 15/223 244/99.5 |

FOREIGN PATENT DOCUMENTS

| | | |
|---|---|---|
| EP | 0 094 257 A2 | 11/1983 |
| KR | 92-11699 U | 7/1992 |
| KR | 20-1997-0028761 U | 7/1997 |
| KR | 10-1998-046555 A | 9/1998 |
| KR | 10-0224172 B1 | 7/1999 |
| KR | 10-0828840 B1 | 5/2008 |
| KR | 10-1144941 B1 | 5/2012 |

* cited by examiner

*Primary Examiner* — Dennis H Pedder (74) *Attorney, Agent, or Firm* — McDermott Will & Emery LLP (57) ABSTRACT

An opening and closing device of an air vent for a vehicle is provided for raising or lowering the air vent so as to open or close a ventilating part. The opening and closing device includes first and second link parts rotatably provided at both sides of the ventilating part, a hydraulic cylinder part having one side fixed to the air vent and the other side connected to the first link part, a piston rod part having one side connected to the second link part and the other side slidably coupled to the hydraulic cylinder part, and an adjusting part fixing the piston rod part to not slide into the hydraulic cylinder part or release the piston rod part to be slidable.

11 Claims, 6 Drawing Sheets

OPENING AND CLOSING DEVICE OF AIR VENT FOR VEHICLE

CROSS-REFERENCE TO RELATED APPLICATION

This application is based on and claims priority from Korean Patent Application No. 10-2013-0016167, filed on Feb. 15, 2013 in the Korean Intellectual Property Office, the disclosure of which is incorporated herein in its entirety by reference.

BACKGROUND

1. Field

The present disclosure relates to an opening and closing device of an air vent for a vehicle, and more particularly, to an opening and closing device of an air vent for a vehicle capable of opening and closing the air vent even with small force.

2. Background

Generally, an air vent for a vehicle, which is an indoor ventilator such as those mounted in buses, is opened and closed using an opening and closing device.

Figure 1:
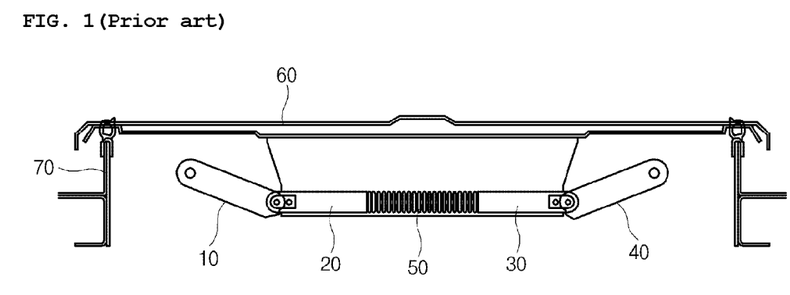
FIG. 1 is a cross-sectional view showing an opening and closing device of a conventional air vent for a vehicle.

An opening and closing of a conventional air vent has a structure of four-bar links 10, 20, 30, and 40 under the air vent 60 and includes a spring 50 disposed between the links 20 and 30 positioned at the center to provide elastic force.

Figure 2:
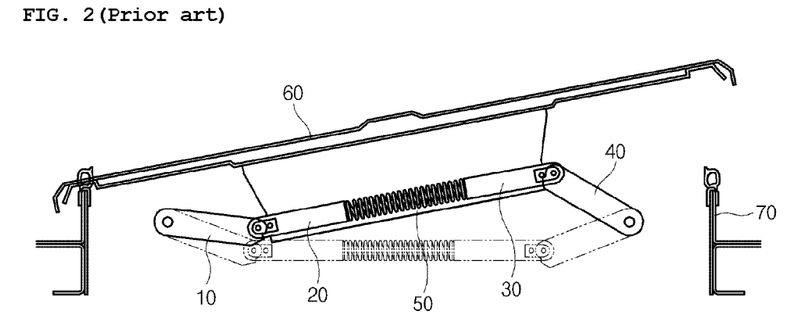
FIG. 2 is a cross-sectional view showing an operating state of the opening and closing device of a conventional air vent for a vehicle.

That is, in the opening and closing of a conventional air vent, the air vent 60 is maintained in a state in which it is closed by the elastic force by the spring 50 (See FIG. 1), the spring is compressed by the links 20 and 30 when the air vent is lifted up, such that the air vent 60 may be opened, and the air vent 60 is maintained in a state in which it is opened by the spring 50 (See FIG. 2).

Here, the spring 50 has a strong elastic force in order to prevent vibration and maintain a watertight state and opening and closing states since the air vent 60 is a ventilator 70 connected to the outside of a vehicle.

However, in the opening and closing of a conventional air vent, large force is required at the time of opening and closing the air vent 60 due to the strong elastic force of the spring 50. Therefore, it is difficult for the old and the weak to open and close the air vent 60.

Further, the air vent 60 collides with a vehicle body when it is closed, such that noise is generated.

In order to solve these problems, "Electrical Roof Vent of Bus" has been disclosed in Korean Patent Laid-Open No. 1997-0034513. However, a lot of costs are required due to an electronic control, and it is impossible to use the electrical roof vent if a fault is generated in the electrical roof vent before the electrical roof vent is repaired by an expert.

Korean Patent Laid-Open Publication No. 1997-0034513 (entitled: "Electrical Roof Vent of Bus")

SUMMARY

Accordingly, the present disclosure has been made to solve the above-mentioned problems while advantages achieved are maintained intact.

One advantage to be achieved by the present disclosure is to provide an opening and closing device of an air vent for a vehicle capable of opening and closing the air vent even with small force using an opening and closing device including a hydraulic cylinder and capable of being easily manufactured and repaired using a mechanical structure.

In one aspect of the present disclosure, there is provided an opening and closing device of an air vent for a vehicle capable of raising or lowering the air vent to open or close a ventilating part, the opening and closing device including: a first link part and a second link part rotatably provided at each side of the ventilating part; a hydraulic cylinder part having one side fixed to the air vent and the other side connected to the first link part; a piston rod part having one side connected to the second link part and the other side slidably coupled to the hydraulic cylinder part; and an adjusting part configured to fix the piston rod part to not slide into the hydraulic cylinder part or release the piston rod part to be slidable.

The hydraulic cylinder part may include a housing having one end fixed to the air vent and the other end connected to the first link part, a hydraulic cylinder inserted into the housing and having a guide rail formed in a length direction therein, and a fluid filled in the hydraulic cylinder.

The piston rod part may include a torsion bar connected to the second link part and a piston head rotatably and slidably coupled to the hydraulic cylinder part and provided with first through-holes.

The adjusting part may include a coupling hole coupled to a coupling part provided in the piston head, a guide groove slidably coupled to the guide rail, and second through-holes connected to the first through-holes at the time of rotation of the piston rod part.

The adjusting part may be configured to allow the fluid filled in the hydraulic cylinder part to not pass through the piston head when the first through-hole of the piston head is blocked through a surface to fix the piston rod part to not slide, and allow the fluid filled in the hydraulic cylinder part to pass through the piston head when the first through-hole of the piston head is opened through the second through-hole to release the piston rod part to be slidable.

The adjusting part may move linearly along the guide rail in a state in which it is not rotated when the piston rod part is slid while being rotated.

A bearing may be provided between the coupling hole and the coupling part.

The hydraulic cylinder may be slidably inserted into the housing, and an elastic member elastically supporting the hydraulic cylinder may be provided between an outer peripheral surface of the hydraulic cylinder and an inner peripheral surface of the housing.

A vertical surface on which the housing and the hydraulic cylinder correspond to each other may be provided with a buffering member.

The first or second through-holes may be provided in plural.

The first and second link parts may be fixed to the ventilating part to rotate in a first direction, and the piston rod part may be fixed to the second link part to rotate in a second direction different than the first direction, such that the piston rod part is twisted based on the second link part at the time of being rotated to generate twisting force.

The piston rod part may be provided with a knob configured to rotate the piston rod part.

Both sides of the ventilating part may be provided with the opening and closing devices and in the opening and closing devices provided at both sides of the ventilating part, the knobs of the piston rod parts may be connected to each other.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

An opening and closing device of an air vent for a vehicle according to an exemplary embodiment of the present disclosure includes a first link part and a second link part and a hydraulic cylinder part, a piston rod part, and an adjusting part disposed between the first and second link parts, thereby making it possible to maintain the air vent in a current state by hydraulic pressure or open and close the air vent even with small force by removing the hydraulic pressure.

Hereinafter, exemplary embodiments of the present disclosure will be described in detail with reference to the accompanying drawings so that they can be practiced by those skilled in the art to which the present disclosure pertains. However, the present disclosure may be implemented in various different forms and is not limited to the embodiments provided in the present description. In the accompanying drawings, portions unrelated to the description will be omitted in order to describe the present disclosure, and similar reference numerals will be used to describe similar portions throughout the present specification.

Figure 3:
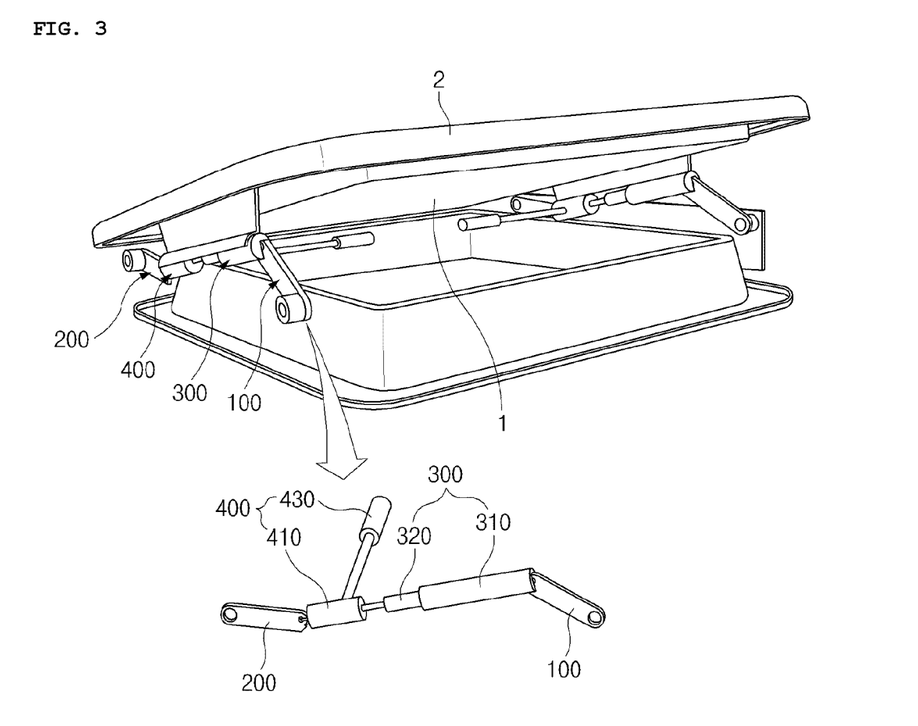
FIG. 3 is the entire perspective view showing an opening and closing device of an air vent for a vehicle according to an exemplary embodiment of the present disclosure.
Figure 4:
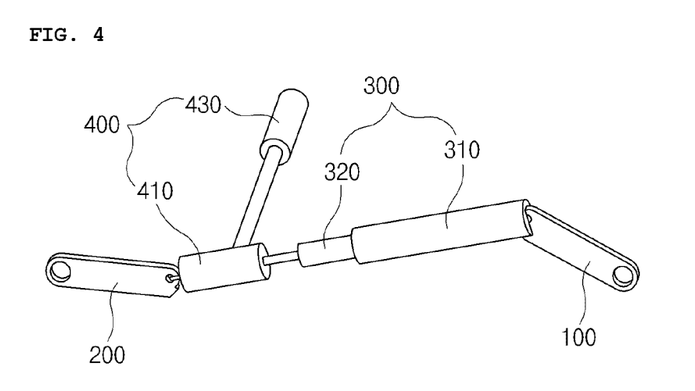
FIG. 4 is an enlarged perspective view showing the opening and closing device of an air vent for a vehicle according to an exemplary embodiment of the present disclosure.
Figure 5:
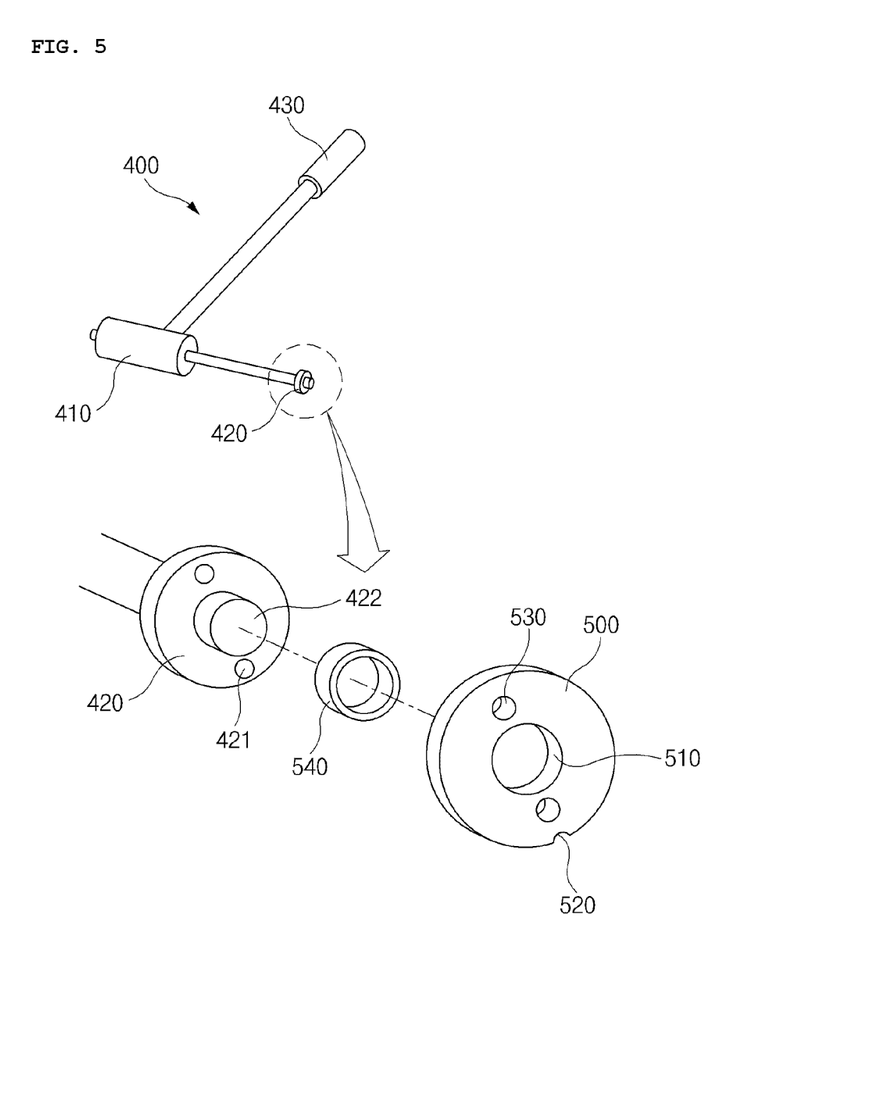
FIG. 5 is a perspective view showing a piston rod part and an adjusting part according to an exemplary embodiment of the present disclosure.

One opening and closing device of an air vent for a vehicle according to an exemplary embodiment of the present disclosure, is provided between a ventilating part 1 and an air vent 2 to vertically move the air vent 2, thereby opening and the closing the ventilating part 1. As shown in FIG. 3, the opening and closing device is configured to include a first link part 100 and a second link part 200 provided at both sides of the ventilating part 1, a hydraulic cylinder part 300 having one side fixed to the air vent 2 and the other side connected to the first link part 100, a piston rod part 400 having one side connected to the second link part 200 and the other side slidably coupled to the hydraulic cylinder part 300, and an adjusting part 500 fixing the piston rod part 400 to not slide into the hydraulic cylinder part 300 or release the piston rod part 400 to be slidable, as shown in FIGS. 3, 4 and 5.

That is, in the opening and closing device of an air vent for a vehicle according to an exemplary embodiment of the present disclosure, the first and second link parts 100 and 200 may be rotated upwardly or downwardly, and the hydraulic cylinder part 300 and the piston rod part 400 move upwardly or downwardly according to the first and second link parts 100 and 200. The air vent 2 may be interlocked with the hydraulic cylinder part 300 to ascend or descend, thereby opening and closing the ventilating part 1. In the case in which the first and second link parts 100 and 200 are rotated in a corresponding direction, the full lengths of the hydraulic cylinder part 300 and the piston rod part 400 may be decreased while the piston rod part 400 is slid.

When the piston rod part 400 is fixed by the adjusting part 500 to not slide, the full lengths of the piston rod part 400 and the hydraulic cylinder part 300 are maintained, and the first and second link parts 100 and 200 are supported to not rotate, thereby maintaining the air vent in a current state.

Meanwhile, when the piston rod part 400 is released by the adjusting part 500 to be slidable, the full lengths of the hydraulic cylinder part 300 and the piston rod part 400 may be decreased. Therefore, the hydraulic pressure supporting the first and second link parts 100 and 200 is removed to raise or lower the air vent even with small force, thereby opening and closing the ventilating part.

Hereinafter, a configuration of the opening and closing device of an air vent for a vehicle according to an exemplary embodiment of the present disclosure will be described in detail.

The first and second link parts 100 and 200 are fixed to both sides of the ventilating part 1 mounted in a roof, to be rotatable in a first direction, such as the vertical direction. That is, when the first and second link parts 100 and 200 are rotated upwardly, the air vent 2 ascends to open the ventilating part 1, and when the first and second link parts 100 and 200 are rotated downwardly, the air vent 2 descends to close the ventilating part 1.

Figure 6:
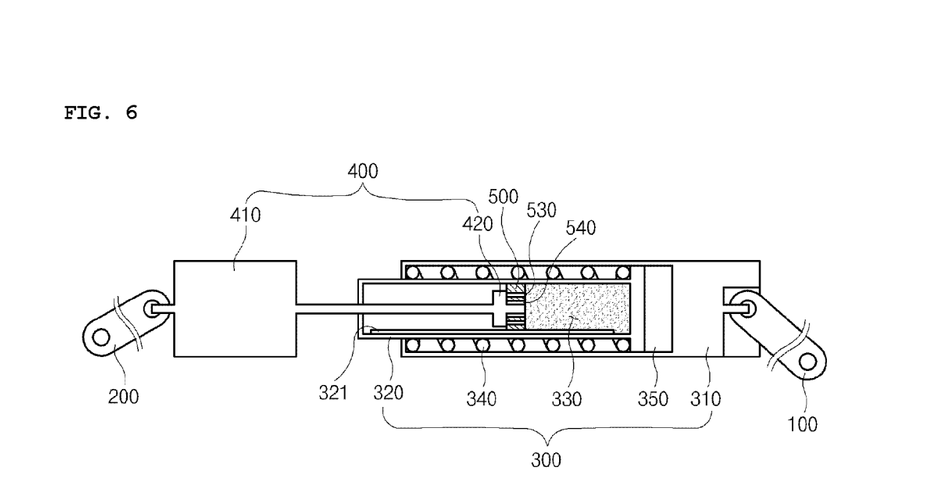
FIG. 6 is a cross-sectional view showing the opening and closing device of an air vent for a vehicle according to an exemplary embodiment of the present disclosure.
Figure 7:
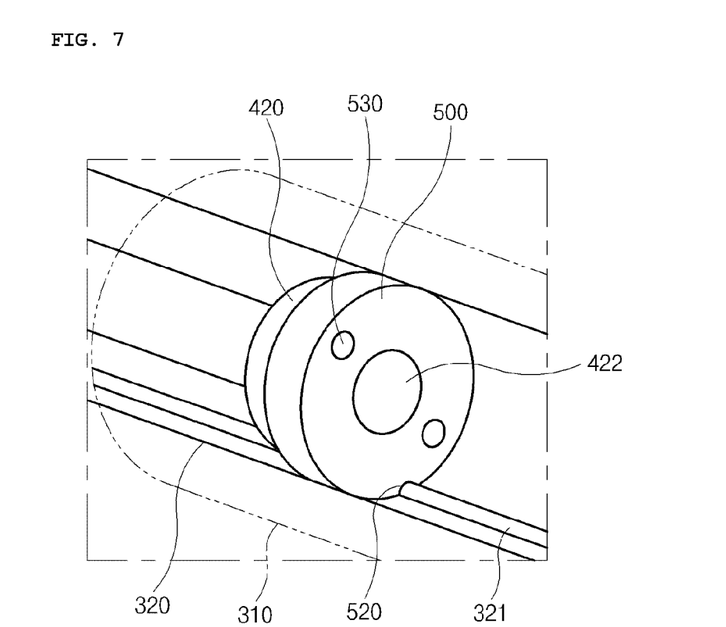
FIG. 7 is a perspective view showing a connection state between a piston rod and an opening and closing member according to an exemplary embodiment of the present disclosure.

As shown in FIGS. 3, 6 and 7, the hydraulic cylinder part 300 includes a housing 310 having one end fixed to the air vent 2 and the other end connected to the first link part 100. A hydraulic cylinder 320 may be inserted into the housing 310 and have a guide rail 321 formed in a length direction therein. A fluid 330 may be contained in the hydraulic cylinder 320.

The housing 310 protects the hydraulic cylinder 320 and moves the air vent 2 upwardly or downwardly according to the first link part 100. In addition, the hydraulic cylinder 320 has a closure space so that a fluid 330 may be contained therein, and the adjusting part 500 may be coupled to the guide rail 321, such that it moves linearly.

Meanwhile, the hydraulic cylinder 320 may be slidably inserted into the housing 310, and an elastic member 340 which elastically supports the hydraulic cylinder 320 in a direction toward the housing 310 is provided between an outer peripheral surface of the hydraulic cylinder 320 and an inner peripheral surface of the housing 310.

The full lengths of the hydraulic cylinder 320 and the housing 310 may be adjusted. Therefore, a size error generated at the time of manufacturing vents having various sizes is effectively compensated for, thereby making it possible to increase compatibility. In addition, the hydraulic cylinder 320 is elastically supported by the elastic member 340, such that the hydraulic cylinder 320 and the housing 310 may be always maintained in the optimal full length state and generation of vibration and noise may be prevented.

Meanwhile, a vertical surface on which the housing 310 and the hydraulic cylinder 320 are closely adhered to each other is provided with a buffering member 350. The buffering member 350 absorbs impact force generated when the hydraulic cylinder 320 collides with the housing 310 while being returned by elastic force of the elastic member 340, thereby preventing generation of vibration and noise.

Figure 8:
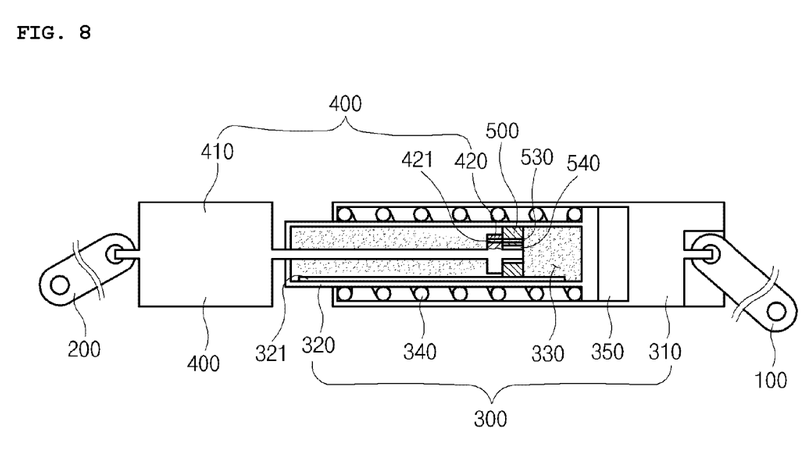
FIG. 8 is a view showing an operating state of the opening and closing device of an air vent for a vehicle according to an exemplary embodiment of the present disclosure.

As shown in FIGS. 5 and 8, the piston rod part 400 may include a torsion bar 410 connected to the second link part 200 and a piston head 420 rotatably and slidably coupled to the hydraulic cylinder 320 of the hydraulic cylinder part 300 and provided with first through-holes 421.

In one embodiment, the piston rod part 400 may be provided with a knob 430 rotating the piston rod part 400. The piston rod part 400 is easily rotated by the knob 430 and is stopped in a state in which it is rotated.

The adjusting part 500 opens or closes the piston head 420 so that the fluid filled in the hydraulic cylinder 320 passes through the piston head 420, thereby adjusting whether or not the piston rod part 400 is slid. The adjusting part 500 includes a coupling hole 510 formed at the center thereof and freely rotatably coupled to a coupling part 422 provided in the piston head 420, a guide groove 520 formed in a main surface thereof and slidably coupled to the guide rail 321, and second through-holes 530 may be formed in a surface thereof and connected to the first through-holes 421 at the time of rotation of the piston rod part 400, as shown in FIG. 5.

In one embodiment, when the piston rod part 400 is slid while being rotated, the adjusting part 500 is supported by the guide rail 321, such that it moves linearly along the guide rail 321 in a state in which it is not rotated.

As shown in FIG. 5, the piston head 420 may be rotated at the time of the rotation of the piston rod part 400, such that the first through-hole 421 of the piston rod part 400 and the second through-hole 530 of the adjusting part 500 are connected to each other. Therefore, the fluid filled in the hydraulic cylinder 320 moves through the first and second through-holes 421 and 530, such that the hydraulic pressure supporting the piston head 420 is removed, thereby making it possible to slide the piston rod part 400 as shown in FIG. 6.

A bearing 540 may be provided between the coupling hole 510 of the adjusting part 500 and the coupling part 422 formed in the piston head 420 to decrease frictional force generated between the adjusting part 500 and the coupling part 510 of the piston head 520 and increase rotational force.

The first or second through-holes 421 or 530 may be provided in plural in the piston head 420 or the adjusting part 500 in order to induce smooth movement of the fluid. Therefore, the hydraulic pressure acting on the piston rod part 400 is significantly decreased to induce rapid opening and closing of the air vent 2.

The first and second link parts 100 and 200 may be fixed to the ventilating part 1 to be rotated in a first direction, such as the vertical direction, and the piston rod part 400 is fixed to the second link part 200 so as to be rotated in a second direction different than the first direction, such as the horizontal direction, such that the piston rod part 400 is twisted based on the second link part 200 at the time of being rotated to generate twisting force. The piston rod part 400 may return to its original position by the twisting force.

That is, when the piston rod part 400 is rotated, it is twisted based on the second link part 200 to store the twisting force. In this case, the first through-hole 421 of the piston head 420 and the second through-hole 530 of the adjusting part 500 are connected to each other.

In this state, when external forces acting on the piston rod part 400 are removed, the piston rod part 400 returns to its original position by the twisting force. In this case, the connection between the first through-hole 421 of the piston head 420 and the second through-hole 530 of the adjusting part 500 is blocked.

Therefore, the piston rod part 400 may return to its original position and the connection between the first through-hole 421 of the piston head 420 and the second through-hole 530 of the adjusting part 500 may be blocked, without using a separate device.

The use of the opening and closing device of an air vent for a vehicle according to an exemplary embodiment of the present disclosure having the above-mentioned configuration will be described.

First, when the knob 430 of the piston rod part 400 is pulled downwardly in a state which it is held, the piston rod part 400 is rotated. Therefore, the first through-hole 421 of the piston head 420 and the second through-hole 530 of the adjusting part 500 are connected to each other. Here, the piston rod part 400 is twisted based on the second link part 200 to store the twisting force.

In this state, when the air vent 2 is pushed or pulled, the first and second link parts 100 and 200 may be rotated while being interlocked with the air vent 2 as shown in FIG. 8. In this case, the first and second link parts 100 and 200 are rotated in a corresponding direction to press-fit the hydraulic cylinder part 300 and the piston rod part 400. Therefore, the fluid 330 of the hydraulic cylinder part 300 moves through the first through-hole 421 and the second through-hole 530, such that the piston rod part 400 is slid. As a result, the full lengths of the hydraulic cylinder part 300 and the piston rod part 400 are decreased, and the air vent 2 ascends or descends according to the hydraulic cylinder part 300 to open or close the ventilating part 1.

Here, since the full lengths of the hydraulic cylinder part 300 and the piston rod part 400 may be adjusted due to the connection between the first through-hole 421 and the second through-hole 530, the air vent 2 may ascend and descend even with small force.

When the knob 430 of the piston rod part 400 is released, the piston rod part 400 returns to its original position by the twisting force stored in the piston rod part 400. Therefore, the connection between the first through-hole 421 and the second through-hole 530 of the adjusting part 500 is blocked, and the fluid 330 of the hydraulic cylinder part 300 does not move through the first through-hole 421 and the second through-hole 530. Rather, the fluid is blocked, such that the piston head 420 of the piston rod part 400 is fixed to not slide, the full lengths of the hydraulic cylinder part 300 and the piston rod part 400 are maintained, and the first and second link parts 100 and 200 are supported to not rotate, thereby maintaining the air vent 2 in a current state. In this state, even though the air vent 2 is pulled or pushed without large force, it does not move, but is maintained in a state in which it is fixed.

Therefore, the opening and closing device of an air vent for a vehicle according to an exemplary embodiment of the present disclosure includes the hydraulic cylinder part 300, the piston rod part 400, and the adjusting part 500 disposed between the first and second link parts 100 and 200, thereby making it possible to open and close the air vent 2 with a small force, to provide more stable support for the air vent 2, and to fix the air vent 2.

In the opening and closing device of an air vent for a vehicle according to an exemplary embodiment of the present disclosure, both sides of the ventilating part 1 are provided with opening and closing devices. In the opening and closing devices provided at both sides of the ventilating part 1, the knobs 430 of the piston rod parts 400 are connected to each other. Therefore, since the piston rod parts 400 of the opening and closing devices provided at both sides of the ventilating part 1 may be simultaneously rotated by the connected single knob 430, convenience of use may be achieved.

According to an exemplary embodiment of the present disclosure, the opening and closing device of an air vent is configured using the hydraulic cylinder, thereby making it possible to open and close the air vent even with small force. In addition, a mechanical structure is used, thereby making it possible to decrease a manufacturing cost of the opening and closing device of an air vent and easily repair the opening and closing device of an air vent.

It should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. An opening and closing device of an air vent for a vehicle capable of raising or lowering the air vent so as to open or close a ventilating part, the opening and closing device comprising:
    a first link part and a second link part rotatably provided at both sides of the ventilating part;
    a hydraulic cylinder part having one side fixed to the air vent and the other side connected to the first link part;
    a piston rod part having one side connected to the second link part and the other side slidably coupled to the hydraulic cylinder part; and
    an adjusting part configured to fix the piston rod part to not slide into the hydraulic cylinder part or release the piston rod part to be slidable,
    wherein the piston rod part includes a torsion bar connected to the second link part and a piston head rotatably and slidably coupled to the hydraulic cylinder part and provided with first through-holes.

2. The opening and closing device according to claim 1, wherein the hydraulic cylinder part includes:
    a housing having one end fixed to the air vent and the other end connected to the first link part;
    a hydraulic cylinder inserted into the housing and having a guide rail formed in a length direction therein; and
    a fluid filled in the hydraulic cylinder.

3. The opening and closing device according to claim 1, wherein the adjusting part includes:
    a coupling hole coupled to a coupling part provided in the piston head;
    a guide groove slidably coupled to a guide rail; and
    second through-holes connected to the first through-holes at the time of rotation of the piston rod part.

4. The opening and closing device according to claim 3, wherein the adjusting part is configured to:
    allow fluid filled in the hydraulic cylinder part to not pass through the piston head when the first through-hole of the piston head is blocked through a vertical surface, thereby fixing the piston rod part to not slide, and
    allow the fluid filled in the hydraulic cylinder part to pass through the piston head when the first through-hole of the piston head is opened through the second through-hole, and release the piston rod part to be slidable.

5. The opening and closing device according to claim 3, wherein the adjusting part is configured to move linearly along a guide rail such that it is not rotated when the piston rod part is slid while being rotated.

6. The opening and closing device according to claim 3, wherein a bearing is provided between the coupling hole and the coupling part.

7. The opening and closing device according to claim 2, wherein the hydraulic cylinder is slidably inserted into the housing, and
    an elastic member configured to elastically support the hydraulic cylinder is provided between an outer peripheral surface of the hydraulic cylinder and an inner peripheral surface of the housing.

8. The opening and closing device according to claim 2, wherein a vertical surface on which the housing and the hydraulic cylinder correspond to each other is provided with a buffering member.

9. The opening and closing device according to claim 3, wherein the first or second through-holes are provided in plural.

10. The opening and closing device according to claim 1, wherein the first and second link parts are fixed to the ventilating part and configured to rotate in a first direction, and
    the piston rod part is fixed to the second link part and configured to rotate in a second direction different than the first direction, such that the piston rod part is twisted based on the second link part at the time of being rotated to generate twisting force.

11. The opening and closing device according to claim 1, wherein the piston rod part is provided with a knob configured to rotate the piston rod part.

\* \* \* \* \*